Jan. 23, 1934.  J. K. CLAPP  1,944,315
ELECTRIC SYSTEM AND METHOD
Filed Oct. 22, 1931   4 Sheets-Sheet 1

INVENTOR
JAMES K. CLAPP.
BY
ATTORNEY

Jan. 23, 1934.   J. K. CLAPP   1,944,315
ELECTRIC SYSTEM AND METHOD
Filed Oct. 22, 1931   4 Sheets-Sheet 3

INVENTOR
JAMES K. CLAPP.
BY
ATTORNEY

Jan. 23, 1934.          J. K. CLAPP          1,944,315
ELECTRIC SYSTEM AND METHOD
Filed Oct. 22, 1931     4 Sheets-Sheet 4

INVENTOR
JAMES K. CLAPP.
BY David Rines
ATTORNEY

Patented Jan. 23, 1934

1,944,315

UNITED STATES PATENT OFFICE 1,944,315

ELECTRIC SYSTEM AND METHOD

James Kilton Clapp, Auburndale, Mass., assignor to General Radio Company, Cambridge, Mass., a corporation of Massachusetts Application October 22, 1931. Serial No. 570,279

2 Claims. (Cl. 250—39)

The present invention relates, in its general aspect, to electric systems and methods, and more particularly to meters for and methods of measuring the frequency of such systems. From a more narrow aspect still, the invention relates,—though it is by no means limited thereto,—to frequency deviation meters. In a further aspect, the invention relates to a voltage comparing device, having application in electrical measurements.

One object of the present invention is to provide an improved method of, and systems and apparatus for, measuring the deviation, from a predetermined or constant assigned value, of a wave frequency, such as that of a radio-transmitting station.

A further object is to provide a new and improved, high-precision, frequency standard.

Another object is to provide for a continuous, instantaneous indication of the deviation of one frequency standard from the mean of a number of such standards.

A further object is to provide an improved audio-frequency meter, and particularly for directly indicating small deviations of an audio frequency from a prescribed value.

Still another object is to provide a new and improved control in accordance with changes in audio frequency.

Still another object is to provide a new and improved voltage-comparing device.

Figure 1:
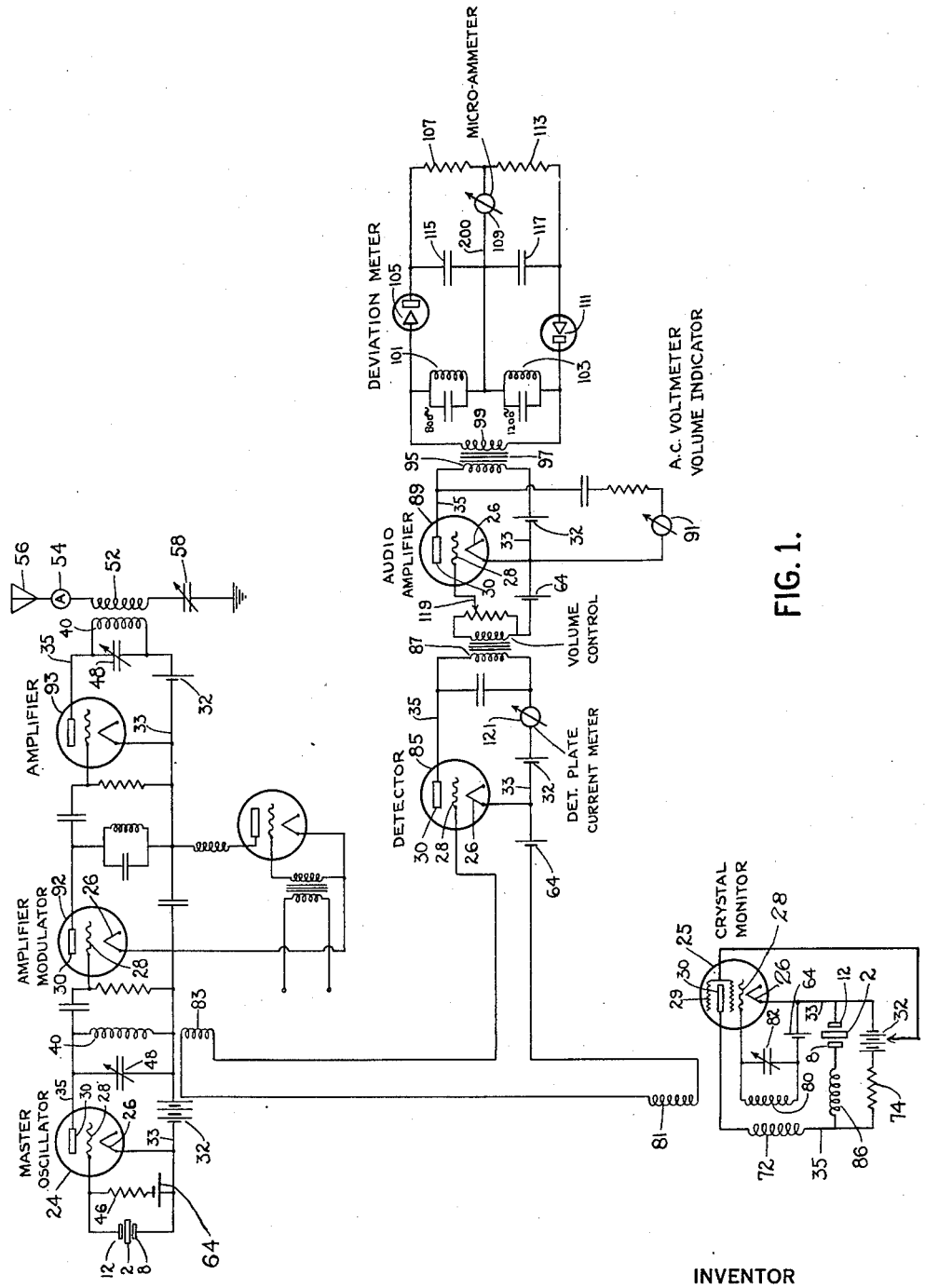

Other and further objects will be explained hereinafter in connection with the accompanying drawings, in which Fig. 1 is a diagrammatic view of circuits and apparatus arranged and constructed according to a preferred embodiment of the invention; and Figs. 2 to 5 are similar views of modifications.

The invention is illustrated in Fig. 1 as applied to a radio-telephonic transmitting system, though corresponding connections for radio-telegraphic transmitters, and for transmitting or receiving by radio telephone or telegraph, or by telegraph or telephone over line wires, and for carrier-current systems, will be obvious to persons skilled in the art.

The constant frequency of the transmitting system, according to the preferred embodiment of the invention illustrated, is attained by the interaction upon the system of an electro-mechanical vibrator, like a piezo-electric crystal 2, provided with electrodes 8 and 12. This is not, however, essential, for it is immaterial to the carrying out of the present invention how the constancy of the transmitting frequency is obtained, the invention being more particularly concerned, from this aspect thereof, with measuring the deviation of the frequency from the predetermined, assigned frequency of the system.

The master oscillator of the illustrated transmitting system comprises a vacuum tube 24 provided with three sensitive elements or electrodes, namely, a filament 26, a grid 28 and an anode or plate 30. The vibrator 2 is shown connected in the input circuit of the tube 24, between the filament 26 and the grid 28, shunted by a resistor of high resistance, a choke coil, or the like 46. A plate battery 32 is connected with the filament 26 by a conductor 33, and with the plate 30 by a conductor 35. The plate or output circuit thus formed is shown tuned by a resonant circuit comprising an inductance coil 40 and a tuning condenser 48. Other apparatus and connections, such as the use of a biasing battery 64 in the input circuit, need not be explained at length, as they are known to persons skilled in the art. This master oscillator, known as the Pierce oscillator, will oscillate with a frequency determined by the frequency of some normal mode of mechanical vibration of the vibrator and substantially independent of the electrical parameters of the circuits.

In order to adapt the master oscillator for transmission, it is coupled in a usual manner, capacitively or otherwise, to an amplifier-modulator 92. This, in turn, is coupled to an amplifier 93. The output circuit of the amplifier 93 is coupled to a coil 52 connected, through a thermo-ammeter 54, to an antenna 56, and through a tuning condenser 58, to the ground.

The signal waves of the master oscillator of the transmitting station are caused to beat with the waves of a local oscillator or monitor 25 the frequency of the oscillations of which is different from that of the signal waves and which, furthermore, is maintained constant to an extreme degree of precision. It is important that the monitoring source be set at a predetermined, exceedingly constant, frequency different from the transmitter frequency. Any oscillator answering to this requirement may be used as the reference standard, but it is preferred to employ a temperature-controlled, piezo-electric crystal monitor disclosed in a copending application, Serial No. 551,665, filed July 18, 1931.

The input or grid circuit of the local oscillator comprises, in addition to a filament 26 and a grid 28, a winding 80 shunted by a tuning condenser 82. The effect of the plate-to-grid capacitance is neutralized or eliminated, in any desired way, as by using a screened-grid tube, the screening element of which is shown at 29. The plate or output circuit extends from the filament 26, by way of the conductor 33, to the piezo-electric-crystal vibrator 2, the latter in parallel with the plate battery 32 and a resistor 74. The resistor 74 may be replaced by a radio-frequency choke coil, an inductance winding, or a combination of inductance and capacitance, and is so chosen that the radio frequency current through it is small in comparison with that through the crystal. In all cases, the purpose of the element 74 is to diminish the radio-frequency current flowing through the battery circuit. The output circuit continues to the plate 30 by way of the conductor 35, and through an output winding 72, inductively coupled to the winding 80. An inductor 86 is inserted in series with the coupling inductor 72 and the crystal 2, and in parallel to the battery 32 and the resistor 74. This inductor 86 is of such reactance as to produce, at the natural crystal frequency, series resonance with the capacitance of the air gap between the crystal 2 and its electrodes 8 and 12. As the inductive and capacity reactances in the grid circuit are zero at parallel resonance, and as the inductive and capacity reactances in the plate circuit, plus the capacity reactance of the crystal air gap, are zero at series resonance, when the reaction of the crystal becomes purely resistive, the effect of the capacitance of this air gap becomes thus neutralized.

The current in the winding 72 of the plate or output circuit of the tube is a maximum at the natural frequency of the piezo electric vibrator 2 and will induce a voltage in the winding 80. This voltage is impressed on the grid 28 and appears in amplified form in the output circuit. If the parameters of the circuits are properly chosen, as by appropriate adjustment of the condenser 82, the system, as is explained in the said application, will oscillate at, or very near to, the natural or resonant frequency of the crystal. As is also therein explained, this oscillator is particularly advantageous for use in frequency standards, as in monitoring equipment for broadcasting stations, and it is particularly useful when high stability of frequency is required.

The output coil 72 of the local oscillator is coupled to a coil 81 and the output coil 40 of the unmodulated master oscillator is coupled to a coil 83. The coils 81 and 83 are connected in circuit with a detector 85. A transformer 87 couples the detector to an audio-frequency amplifier 89, which amplifies the beat waves, the desired component being that which is equal to the difference of the two radio frequencies. A volume indicator 91, in the form of an alternating-current voltmeter, is connected across the filament and the plate of the audio amplifier 89. A primary winding 95 of a transformer 97 is connected in the output circuit of the audio amplifier 89, the secondary winding 99 being connected in series with two tuned circuits 101 and 103. Any other desired coupling means could equally well be employed. A rectifier 105 is connected in series with a resistor 107 and a pointer-type micro-ammeter 109 across the tuned circuit 101. A rectifier 111 is similarly connected in series with a resistor 113 and the meter 109 across the tuned circuit 103. Condensers 115 and 117 are provided for by-passing the audio-frequency current.

The beat frequency produced by combining the waves of the unmodulated master oscillator 24 of the transmitter with the local oscillator 25 through the respective coupling coils 81 and 83 is detected by the detector 85 and is amplified by the audio amplifier 89, appearing ultimately in the secondary winding 99 of the transformer 97. The circuits 101 and 103 are tuned respectively above and below this beat frequency. The detectors 105 and 111, though shown as of the vacuum-tube type, may be of any other desired type, and are arranged to suppress opposite halves of the beat-frequency waves. The oppositely rectified beat-frequency waves will thus respectively traverse the output circuits 101, 105, 107, 109 and 103, 111, 113, 109 in opposite directions. The resultant current will actuate the meter 109 in one direction or the other from an intermediate, zero value.

A particular advantage of the system shown is that very little modification of its operation results when a distorted beat-frequency wave is applied, instead of an undistorted or sine wave. It will be noted that while the two tuned circuits 101 and 103 offer appreciable reactances, of opposite sign, to the fundamental beat-frequency component, as explained in further detail below, they offer very low reactances of the same sign, to multiples of this frequency, that is, to the harmonic frequencies. The low reactances tend to reduce the effects of the harmonic voltages, but further, because the reactances are of essentially equal magnitudes, the desired state of balance of the voltages of fundamental frequency developed across the tuned circuits 101 and 103 is not materially disturbed. A differential operating condition is thus established for the fundamental frequency, which is the desired working component, while the system is practically non-responsive to voltages of the harmonic frequencies. This condition is much to be desired, as the performance is thereby rendered practically independent of the wave form of the applied voltage.

In order the better to explain the operation, let it be assumed that the frequency of the crystal monitor is set at 1,000 cycles below or above the assigned radio frequency at which the transmitter is intended or required to operate, and that it is desired to measure the deviations, from the assigned frequency, of the frequency at which the transmitter is actually operating. For example, a broadcast transmitting station may be required to keep within 50 cycles of a given, assigned, predetermined carrier wave frequency in the broadcasting band, and though the crystal vibrator 2, usually temperature controlled, may be capable of ensuring this degree of accuracy, it may become desirable to check the wave frequency of the transmitter, to determine whether it is within the 50-cycle limit.

The locally generated oscillations of the crystal monitor will beat with the oscillations of the transmitter. A beat frequency of 1,000 cyces per second will therefore appear in the secondary winding 99 when the transmitter is operating at its assigned frequency, and the value of this beat frequency will vary, to one side or the other of 1,000 cycles per second, as the transmitter-signal frequency increases or decreases. Let it further be assumed that the circuit 101 is tuned to 800 cycles and the circuit 103 to 1,200 cycles. When the transmitter operates at its assigned frequency, therefore, the circuit 101, 105, 107, 109 will pass a rectified current having a 1,000-cycle frequency in one direction, and the circuit 103, 111, 113, 109 will pass a like rectified current of 1,000 cycles in the opposite direction.

The reactances of the condensers 115, 117 of the output circuits 115, 107, 109 and 117, 113, 109 must be low, in comparison with the resistances 107, 113, at the audio frequency used. These condensers are consequently charged through the rectifiers to the peak value of the applied voltage. The charge leaks off slowly through the resistances, the motion of this charge constituting the discharge current. By the proper choice of the circuit parameters, the discharge current is made strictly proportional to the applied voltage over a wide range of voltage magnitudes.

The microammeter 109, of the common, direct-current type, reads the average value of the discharge currents of the condensers. Since the rectifiers are connected in opposition, the meter needle occupies its zero position at the center of its scale, when the voltages applied to the two branches 101, 105, 107, 109 and 103, 111, 113, 109 of the system are equal.

When the transmitter frequency is above or below its assigned frequency, the beat frequency will be greater or less than 1,000, with the result that greater or smaller currents will flow in the respective circuits 101, 105, 107, 109 and 103, 111, 113, 109, causing the needle of the meter 109 to swing in one direction or the other. Since the direct-current output is proportional to the deviation of the applied frequency from the "standard" or reference value, as just explained, the degree of swing of the meter needle will measure the deviation of the transmitter frequency from its assigned value. If the beat frequency is less than 1,000 cycles, more current will flow in the output circuit 101, 105, 107, 109 than in the output circuit 103, 111, 113, 109, and conversely. Both the amount and the sign of the deviation of the station carrier frequency from that of the monitoring piezo-electric oscillator 25 may thus be indicated.

The microammeter 109 may be graduated in terms of frequency, for example, from $-100$, through zero, to $+100$, in, say, ten-cycle steps. The calibrations will not, however, accurately indicate the desired deviations unless the difference-frequency voltage remains constant for the various values of difference frequency. The voltage of the output circuit of the audio amplifier 89 is therefore adjusted by means of a volume control 119, prior to each reading, so as to give the same reading in a voltmeter 91. When there is no deviation in the transmitter frequency that is, when the beat frequency, in the above example, is 1,000 cycles, it is not necessary to adjust the voltage in the transformer 97, as the meter 109 will then read correctly at zero for all intensities.

A suitable milliammeter 121 may be inserted in the output circuit of the detector 85 for checking the proper, radio-frequency, operating voltage from the transmitter and from the monitor.

Figure 2:
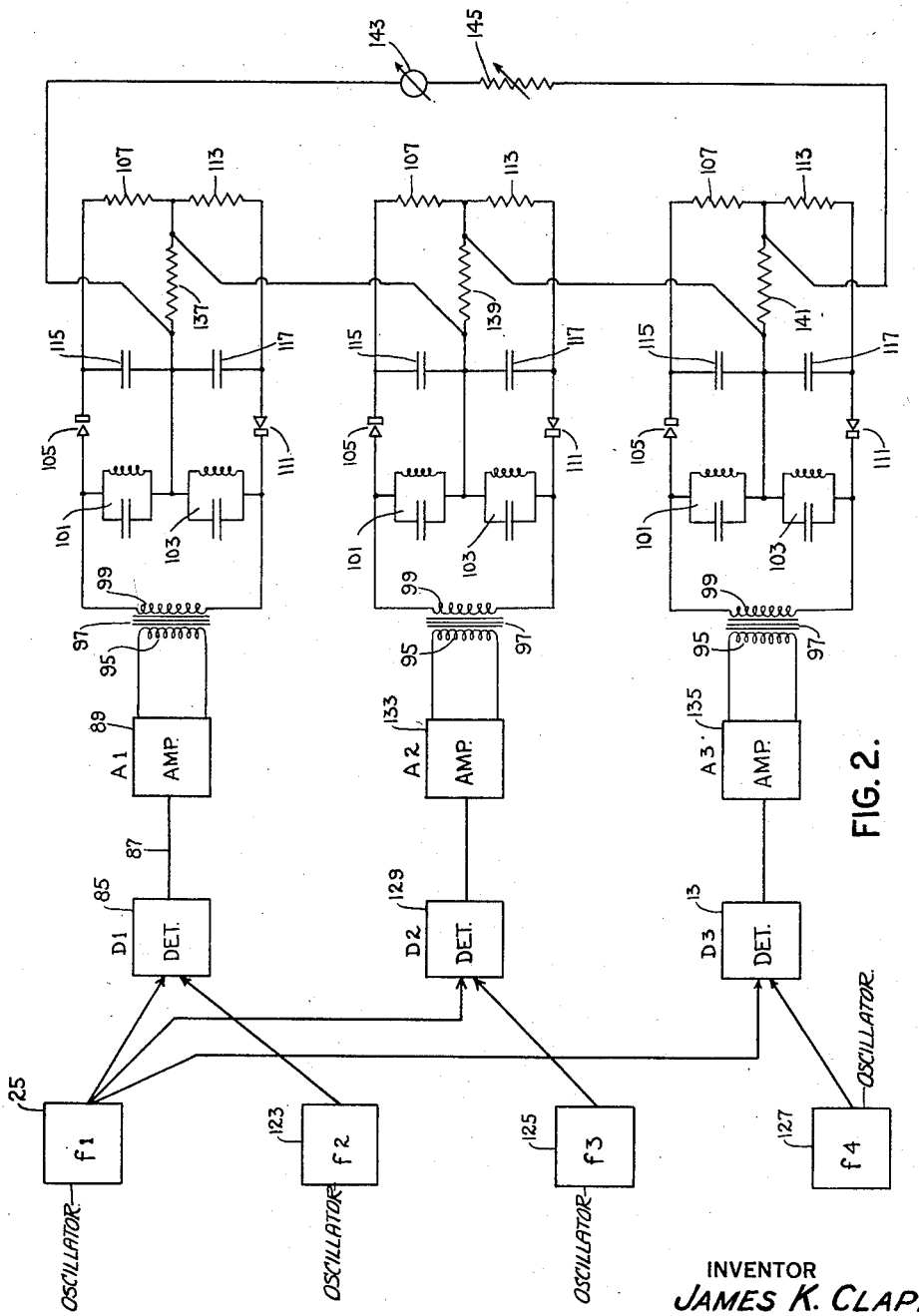

A further application of the invention is to high-precision, frequency standards, as illustrated in Fig. 2, where 25 represents a standard-frequency oscillator, such as the temperature-controlled, crystal monitor described above, and 123, 125 and 127 are similar oscillators. The frequencies of the oscillators 123, 125, and 127 may be assumed equal, and the frequency of the master oscillator 25 may be assumed to be 1,000 cycles different therefrom, as before. Let the frequencies of the oscillators 25, 123, 125 and 127 be represented by $f_1$, $f_2$, $f_3$ and $f_4$.

The oscillators 25 and 123, 25 and 125, and 25 and 127 are caused to produce beats in separate detectors 85, 129 and 131 of like character, which are provided, as illustrated. An output voltage is thus taken from each of the oscillators 123, 125 and 127 to the respective detectors 85, 129 and 131 in such fashion that there will be produced in the output circuits of the detectors 85, 129 and 131, respectively, beat frequencies equal, respectively, to $$f_1-f_2,$$
$$f_1-f_3,$$

and $$f_1-f_4.$$

These difference tones are amplified by the respective amplifiers 89, 133 and 135, and applied to deviation indicators, comprising tuned circuits of the same character heretofore described and illustrated in Fig. 1. The microammeter 109 of Fig. 1 is, however, replaced in the deviation output circuits by resistors 137, 139 and 141, respectively. These resistors are connected in series with a microammeter 143 and a regulating resistor 145.

The direct-current output of the first deviation instrument, being proportional, as before stated, to the deviation of the input frequency from its prescribed value, may be represented by $$e_1 = k(f_1-f_2),$$

and similarly, for the other two instruments, $$e_2 = k(f_1-f_3)$$

and $$e_3 = k(f_1-f_4),$$

it being understood that $e_1$, $e_2$ and $e_3$ may be positive or negative, depending upon whether the difference frequencies $f_1-f_2$, $f_1-f_3$ and $f_1-f_4$ are above or below the respective prescribed values.

The indication of the meter 143 is proportional to the algebraic sum of the voltages impressed upon the series circuit in which it is connected, that is, to $$e_1+e_2+e_3 = 3k\left(f_1 - \frac{f_2+f_3+f_4}{3}\right).$$

That is, the indication of the meter 143 is proportional to the difference between the frequency $f_1$ and the mean of the frequencies $f_2$, $f_3$ and $f_4$.

By adjustment of the resistor 145, and proper choice of the meter 143, the latter may be made to indicate the desired variation in units of convenient magnitude.

If the frequencies $f_1$, $f_2$, $f_3$, $f_4$ are low radio frequencies, say 50 kilocycles, the precision of the result may be improved by multiplying these frequencies to a convenient value, say 1,000 kilocycles, before applying the output to the detectors 85, 129 and 131. In this manner, the meter 143 may be made to indicate the deviation of the frequency $f_1$ from the mean of the frequencies $f_2$, $f_3$, and $f_4$ directly in parts per million.

The equipment may also be used directly at audio-frequencies as a narrow-range frequency meter. While the preceding description has been confined to the performance of the apparatus when operated from a beat frequency of value near 1,000 cycles per second, obtained by beating two radio-frequency waves, the equipment would operate equally well from a conventional audio-frequency source. In this case, the range of indication may be narrowed to a great degree by proper choice of the circuit parameters of the elements 101 and 103, and by reduction of the resistances of these elements. An application, therefore, of this apparatus is in the measurement of audiofrequencies and in the measurement and direct indication of small deviations of an audiofrequency from its prescribed value.

The equipment is also adaptable to the controlling of mechanisms as the result of a slight change in the applied audiofrequency, whether this applied frequency is derived from conventional sources of audiofrequency or by indirect methods, such as beating. A particular embodiment will be described in connection with Fig. 3, as illustrative of this feature of the invention.

Figure 3:
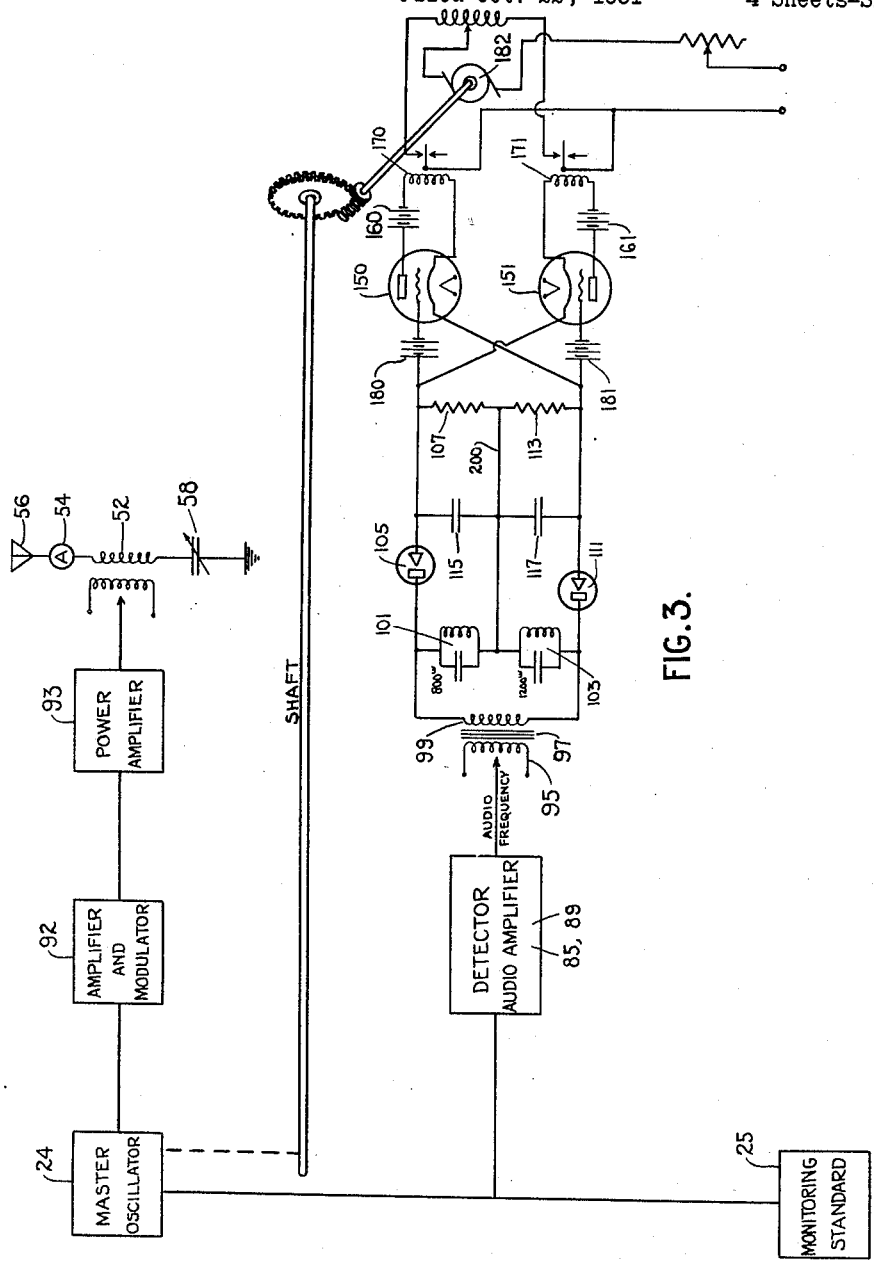

The arrangement of Fig. 1 is indicated in Fig. 3 by the block diagram, while the details of the particular embodiment are indicated in schematic form. It is noted that the rectifier 105 has been reversed, relative to rectifier 111, or vice versa, since it will be shown that the rectified voltages developed across the resistors 107 and 113 will be utilized as the controlling influence, not the currents in the conductor 200 as previously utilized, in the operation of the meter 109.

The resistors 107 and 113 are connected in series in the input circuit, between the filament and the grid, of two vacuum tubes 150 and 151, but in opposite directions.

The rectified voltages are thus applied in series, as grid-biasing voltages, to the vacuum tubes 150 and 151. These rectified voltages are in addition to the voltages of batteries 180 and 181. Relays 170 and 171 are controlled by the output circuits of the respective tubes 150 and 151.

For explanation, let it be assumed that the rectified voltages are equal. As is seen from the diagram, the sum of the voltages across 107 and 113 is then zero and both vacuum tubes 150 and 151 operate in a manner determined solely by the filament, grid and plate supply voltages.

If, now, the rectified voltages are not equal, as is the case when the audio-frequency voltage applied to the transformer 97 deviates from its assigned frequency, the sum of the voltages is no longer zero. The polarity of the sum of the two voltages will depend upon whether the frequency applied is higher or lower than the prescribed value. As shown in Figs. 1 and 3, the rectified output of the rectifier 111, that is, the voltage across the resistor 113, will exceed the output of the rectifier 105, that is, the voltage across the resistor 107, when the applied frequency is higher than its assigned value. The converse holds if the frequency is lower.

For an increase in frequency, then, a positive biasing voltage acts on the grid of the tube 150, increasing its plate current. The same voltage acts in the reversed, or negative sense, on the grid of the tube 151, decreasing its plate current. The relay 170 may thus be made to close when the applied frequency is above the prescribed value and the relay 171 may be made to close if the frequency applied is below the prescribed value.

These relays may be made to effect an adjustment of the frequency of the master oscillator of the radio transmitter to return that frequency to its prescribed value by any one of a number of methods well known to those skilled in the art. For example, a small motor 182 may be arranged to vary a small part of the oscillatory circuit capacity of the master oscillator by operation through a worm reduction gearing. If the motor is caused to rotate in one direction when the relay 170 closes and in the reverse direction when the relay 171 operates, the frequency of the master oscillator may be brought back to its assigned value within very narrow limits. To prevent hunting, the tubes 150 and 151 may easily be adjusted so that, over a very narrow range of frequency variation, neither relay is caused to operate. Over this very narrow range of deviation of frequency, the relays remain inoperative; when the applied frequency deviation exceeds the limits of this zone, the relays immediately operate to return the frequency into the zone.

Figure 4:
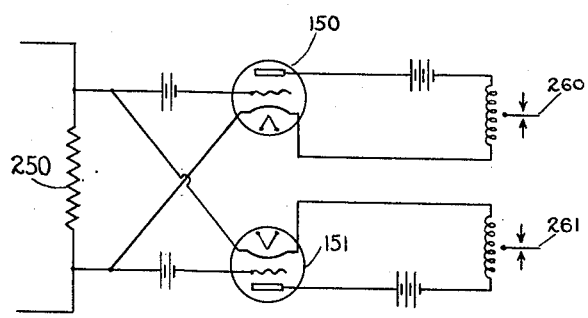

A still further use of the invention is in high-precision frequency standards, as illustrated in Fig. 4. The connections are substantially the same as in Fig. 2, except that the meter 143 is replaced by a resistor 250. The sum of the rectified output voltages across the resistors 137, 139 and 141 has been shown to be proportional to the difference in frequency between the oscillator 25 and the mean of the frequencies of the oscillators 123, 125 and 127. The meter 143 is arranged in Fig. 2 to indicate this difference continuously, and is replaced in Fig. 4 by the resistor 250. Vacuum tubes 150 and 151 are connected across the resistor 250 in the same manner as they are connected across the series-connected resistors 107, 113 of Fig. 3. Relays 260, 261, connected in the output circuits of the tubes 150 and 151 in the same manner as the relays 170, 171 of Fig. 3, may be made to operate whenever the frequency of oscillator 25 deviates by more than an assigned amount above or below the mean frequency of the oscillators 123, 125 and 127. By means such as that previously described, Fig. 3, the frequency of oscillator 25 may thereby be readjusted to its normal value, which is the mean frequency of oscillators 123, 125 and 127.

Figure 5:
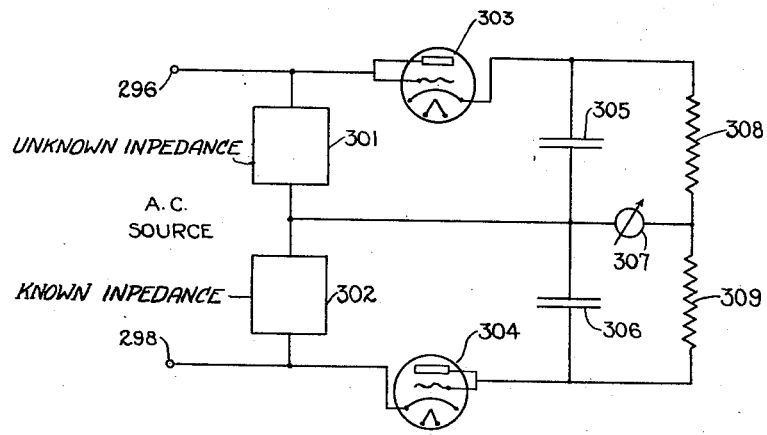

Fig. 5 is illustrative of the use of this invention as a voltage-comparing device in electrical measurements. Two impedances 301 and 302 are connected in series to an alternating-current source, the terminals of which are indicated at 296 and 298. For purposes of illustration, the impedances 301 and 302 may be considered to be of like character and of approximately equal magnitude. The connections of the rectifiers 303 and 304, the condensers 305 and 306, the resistances 308 and 309 and the microammeter 307 are the same as previously described. If the two impedances 301 and 302 are equal, the voltages across them and, in consequence, the voltages across the rectifiers, are equal. The rectified output currents are therefore equal. As these currents pass through the meter 307 in reverse directions, the meter needle assumes its position at an intermediate zero point of its scale.

If the impedances are not equal, the voltages applied to the rectifiers are not equal, but they are in the same proportion as the impedances. The meter 307 is consequently deflected in direction and magnitude an amount proportional to the difference of the impedances 301 and 302.

This is of importance in rapid testing of condensers, inductances, resistances, etc., where it is desired to hold such units within a given tolerance of a standard value. In such cases, the impedance 301 may represent the impedance under test; 302 the standard against which comparison is to be made. By use of regulatory resistances in series and parallel with the meter 307, the indications of the meter may be made to read the differences of the impedance under test from the standard in convenient units, such as percentage deviation. An important feature is that the meter indicates directly whether the deviation is positive or negative, that is, whether the impedance under test is greater or less than the standard unit.

It is desired that the above-described embodiments of the invention shall be regarded as illustrative, and not restrictive, and that the appended claims shall be construed broadly, except insofar as it may be necessary to impose limitations in view of the prior art.

What is claimed is:

1. An electric system having, in combination, two parallel resonant circuits connected in series, one of said circuits being resonant to a frequency above a predetermined frequency, the other being resonant to a frequency below said predetermined frequency, means for supplying a voltage of frequency near said predetermined frequency across said circuits in series, a circuit connected across said resonant circuits in series, said last-mentioned circuit containing a rectifier poled so that currents in said last-mentioned circuit flow in a predetermined direction therearound, a resistor and another rectifier poled to pass currents in said same predetermined direction, around said last-mentioned circuit, a connection from a point between said resonant circuits to a point on said resistor and an indicating device in said connection.

2. An electric system having, in combination, two impedances the voltages across which are equal at a predetermined frequency, means connecting the impedances in series, one of the impedances having a characteristic such that, for frequencies near the predetermined frequency, the voltage across it increases with an increase of frequency, the other impedance having a characteristic such that, for frequencies near the predetermined frequency, the voltage across it decreases with an increase of frequency, means for applying a voltage of frequency near said predetermined frequency across said impedances in series, a circuit connected across said impedances in series, said last-mentioned circuit containing a rectifier poled so that currents in said last-mentioned circuit flow in a predetermined direction therearound, a resistor and another rectifier poled to pass currents in said same predetermined direction, around said last-mentioned circuit, a connection from a point between said impedances to a point on said resistor, whereby said currents oppose each other in said connection, and means in said connection for utilizing the resultant of said opposed currents.

JAMES K. CLAPP.